United States Patent [19]

Cosgrove et al.

[11] Patent Number: 4,809,869
[45] Date of Patent: Mar. 7, 1989

[54] CLOSURE ASSEMBLIES

[75] Inventors: Ronald C. Cosgrove, Alton; Philip Barrowclough, Basingstoke, both of England

[73] Assignee: ITW, Ltd., Camberley, England

[21] Appl. No.: 72,496

[22] Filed: Jul. 13, 1987

[30] Foreign Application Priority Data

Jul. 11, 1986 [GB] United Kingdom ............... 8616925

[51] Int. Cl.$^4$ ............................................. B65D 41/04
[52] U.S. Cl. ............................ 220/288; 220/DIG. 33
[58] Field of Search ........ 220/288, 302, 323, DIG. 33

[56] References Cited

U.S. PATENT DOCUMENTS

| | | | |
|---|---|---|---|
| 3,666,137 | 5/1972 | Blau et al. | 220/288 |
| 3,667,642 | 6/1972 | Blau et al. | 220/288 |
| 3,715,075 | 2/1973 | Blau et al. | 220/288 |
| 3,986,634 | 10/1976 | Smith et al. | 220/288 |
| 4,091,955 | 5/1978 | Sloan, Sr. | 220/288 X |
| 4,294,376 | 10/1981 | Keller | 220/DIG. 33 X |
| 4,299,102 | 11/1981 | Aro | 220/DIG. 33 X |
| 4,494,673 | 1/1985 | Hiraishi | 220/288 |
| 4,676,393 | 6/1987 | Daniel | 220/323 |

*Primary Examiner*—Stephen Marcus
*Assistant Examiner*—Nova Stucker
*Attorney, Agent, or Firm*—Schwartz & Weinrieb

[57] ABSTRACT

A closure assembly, such as a filter cap for a vehicle's fuel tank, comprises a first member formed with a circumferentially arranged series of ratchet teeth, and a second member associated with a pair of pawls, the pawls being continuously urged linearly apart from one another by spring means located between their adjacent ends so that their ends remote from the spring means, which remote ends may each be formed with a plurality of ratchet teeth, are continuously urged into gaps defined between the ratchet teeth formed upon the first member, whereby application of torque to the second member in one rotary sense is initially transmitted by means of the pawls so as to rotate the first member in conjunction therewith until the torque exceeds a predetermined level, whereupon the pawls ride over the ratchet teeth formed upon the first member and the second member is rotated relative to the first member, whereas application of torque to the second member in the opposite rotary sense is always transmitted by means of the pawls so as to rotate the first member in conjunction therewith.

20 Claims, 2 Drawing Sheets

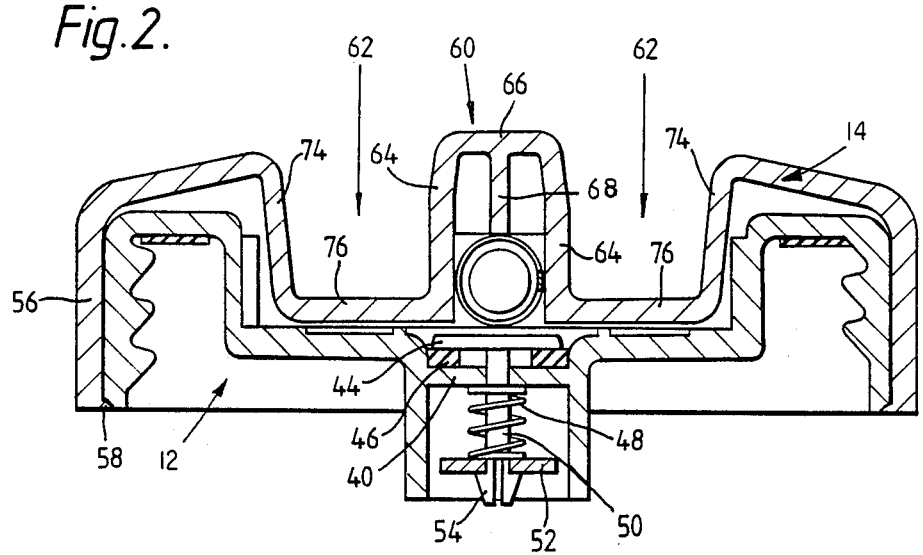
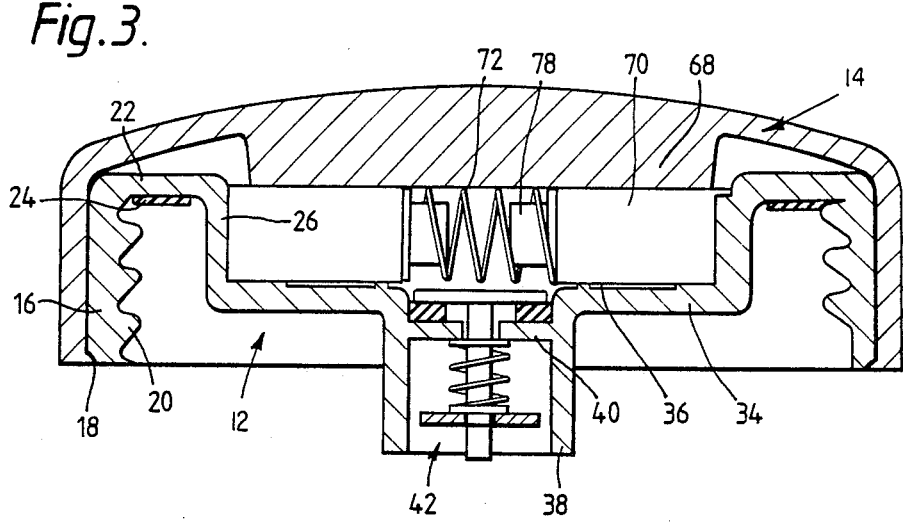

CLOSURE ASSEMBLIES

FIELD OF THE INVENTION

The present invention relates generally to closure assemblies and is particularly, but not exclusively, concerned with filler caps for preventing spillage from fuel tanks of motor vehicles.

BACKGROUND OF THE INVENTION

A problem within the aforenoted technological field has been to provide a filler cap which cannot be over-tightened, is inexpensive to make yet easy to use by both men and women, and can be of an aesthetically attractive appearance, and it has been noted that similar problems have arisen in connection with the provision of closure assemblies for other applications.

SUMMARY OF THE INVENTION

According to the present invention, a closure assembly comprises a first member formed with a circularly arranged series of ratchet teeth, and a second member associated with a pair of pawls, the pawls being continuously urged linearly apart from one another by spring means located between their adjacent ends so that their ends remote from the spring means are continuously urged into gaps between the ratchet teeth, whereby application of torque to the second member in one rotary sense is initially transmitted by the pawls so as to rotate the first member in conjunction therewith until the torque exceeds a predetermined level, whereupon the pawls ride over the ratchet teeth and the second member is rotated relative to the first member, whereas application of torque to the second member in the opposite rotary sense is always transmitted by means of the pawls so as to rotate the first member in conjunction therewith.

It will be appreciated that the aforenoted predetermined level of torque, marking the on-set of ratcheting of the second member typically after a desired degree of tightening of the first member has been achieved, can be altered by altering the force characteristics of the spring means.

Preferably, the ends of the pawls remote from the spring means are each formed with a plurality of ratchet teeth complementary to the ratchet teeth formed upon the first member, thereby enabling the ratchet teeth upon the pawls and the first member to inter-fit closely and alternately, which potentially reduces the free play and increases the areas of abutment for torque transmission.

The first member may be formed with a cylindrical sleeve having internal thread means for enabling the first member to be screwed onto the outside of a hollow article to be closed. The second member may be formed with a cylindrical sleeve having internal engagement means for enabling the second member to be snapped onto the outside of the cylindrical sleeve of the first member. The second member may also be formed with a circular recess which is spanned by means of a diametrical bridge portion housing the pawls and the spring means so as to leave or define a pair of segmental finger portions.

Preferably the closure assembly is adapted for use as a filler cap for a fuel tank upon a motor vehicle by the provison of a pressure relief valve.

BRIEF DESCRIPTION OF THE DRAWINGS

A closure assembly in accordance with the present invention, in the form of a filler cap, will now be described in more detail, by way of example only, with reference to the accompanying drawings, in which:

FIG. 2 is a cross section taken on the line A—A of FIG. 1; and

FIG. 3 is a cross section taken on the line B—B of FIG. 1.

DETAILED DESCRIPTION OF THE PREFERRED EMBODIMENT

Figure 1:
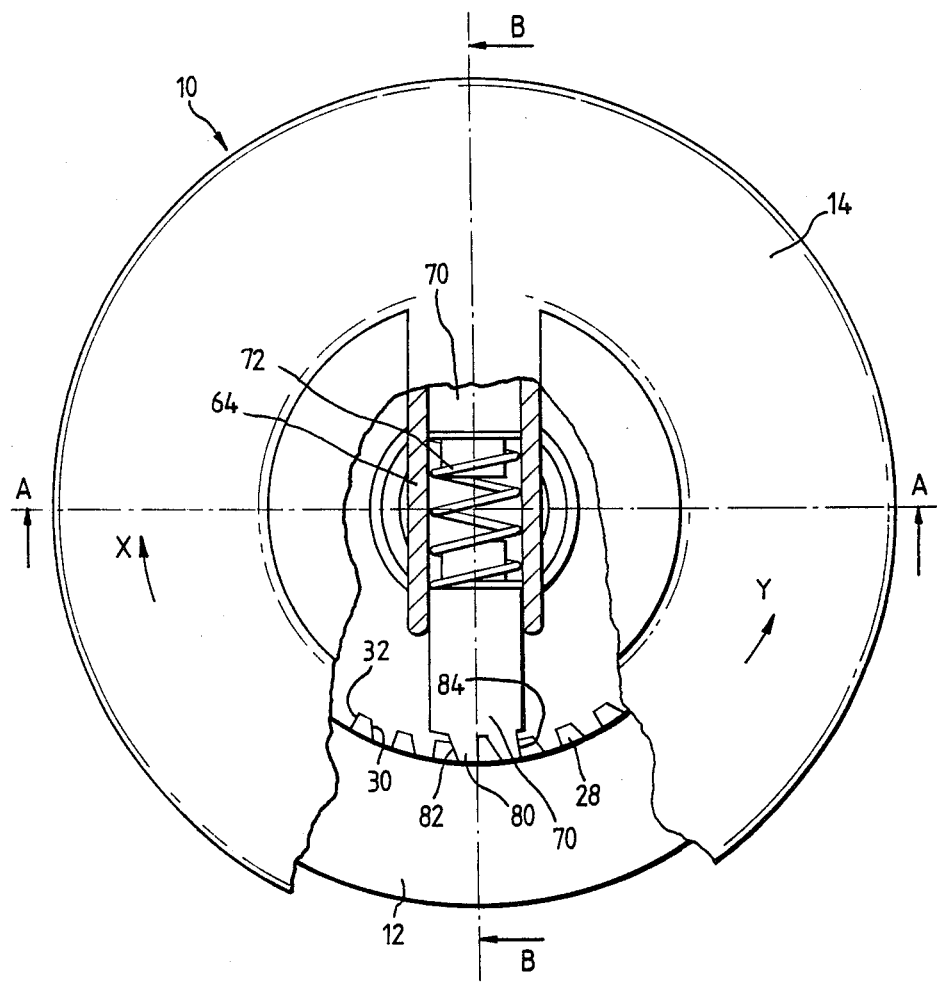
FIG. 1 is a partially fragmented plan view of the filler cap.

A filler cap 10 constituting a closure assembly according to the present invention is shown in the accompanying drawings and includes, as its major components in terms of size, a one-piece plastic inner cap 12 and a one-piece plastic outer cap 14.

The inner cap 12 is the so-called first member of the present invention and may be formed of for example polyester. It includes a cylindrical sleeve 16 formed upon its outer surface with a radially inwardly projecting recess or edge 18 and upon its inner surface with a helical thread 20. The thread 20 may be continuous or dis-continuous or indeed may be of any structure constituting internal thread means for enabling the sleeve 16 to be screwed onto the outside of a hollow article to be closed such as a petrol filler tube. The sleeve 16 is located radially outwardly of an annular portion 22, which lies in a plane perpendicular to the sleeve 16 and has disposed upon its lower face as illustrated a sealing ring 24. The annular portion 22 is located radially outwardly of a cylindrical portion 26 concentric with the sleeve 16 and is formed upon its inner surface with a circularly arranged series of ratchet teeth 28. Each of the ratchet teeth 28 has a cam face 30 and a radial face 32. Radially inwardly of the ratchet teeth 28 is a further annular portion 34, disposed parallel to the annular portion 22 and presenting upon its upper face as illustrated a wide but shallow annular groove 36. Finally, a cylindrical tube 38 concentric with the sleeve 16 is located radially inwardly of the further annular portion 34 and surrounds a centrally apertured disc 40 supporting a pressure relief value 42.

The pressure relief valve 42 has a disc 44 which presses a sealing ring 46 against an adjacent face of the apertured disc 40 under the control of a helical compression spring 48. The disc 44 is affixed to one end of a rod 50 which extends perpendicularly to the disc 44 and passes inter alia axially through the spring 48. One end of the spring 48 acts upon the face of the apertured disc 40 remote from the sealing ring 46. The other end of the spring 48 acts upon a centrally apertured plate 52 which has been snapped past, into abutment with the base of, a slotted and thus inwardly deformable frusto conical enlargement 54 formed at the other end of the rod 50. In use, excessive vapour pressure acts to compress the spring 48. This enables the disc 44 to be lifted from the sealing ring 46 so that the excess petrol vapour escapes between the inner cap 12 and the outer cap 14.

The outer cap 14 is the so-called second member of the present invention and may be formed of for example acetal. It includes a cylindrical sleeve 56 formed upon its inner surface with a plurality of circumferentially spaced edge ribs 58. In assembling the outer cap 14 to the inner cap 12, the ribs 58 snap into the circumferential recess 18 and permit the outer cap 14 to be rotatably secured to the inner cap 12. The ribs 58 may be replaced by other structure constituting internal engagement means for enabling the sleeve 56 to be snapped onto the outside of the sleeve 16. For example, the ribs 58 could instead be formed upon the sleeve 16 and the recessed edge 18 could instead be formed upon the sleeve 56. Located radially inwardly of the sleeve 56 is an inclined annular portion leading to a circular recess which is spanned by means of a diammetrical bridge portion 60 so as to define a pair of segmental finger portions 62. More particularly, the bridge portion 60 includes a pair of side walls 64 and a top wall 66 so as to define a housing, a longitudinal web 68 extending into the housing from the top wall 66 so as to locate a pair of pawls 70 and a helical compression spring 72 within the housing. Each of the finger portions 62 includes an inclined side wall 74 and a segmental bottom wall 76 which permit reception of the fingers and thumb of a user wishing to turn the outer cap 14 by grasping its bridge portion 60. Nevertheless, the user may find it more convenient to turn the outer cap 14 by grasping the outer surface of its sleeve 56.

The pawls 70 are continuously urged linearly apart from one another by means of the spring 72. The spring 72 is located between adjacent ends of the pawls 70, and may in fact be located around spigots 78 formed upon the adjacent ends of the pawls 70, so that the ends of the pawls 70 remote from the spring 72 are continuously urged into gaps defined between the ratchet teeth 28 formed upon the inner cap 12. The remote ends of the pawls are each formed with a plurality, such as two, of ratchet teeth 80 complementary to the ratchet teeth 28 formed upon the inner cap 12. Thus, each of the ratchet teeth 80 has a cam face 82 and a radial face 84. To save material, the pawls 70, which may again be formed of acetal, may be hollow. The annular groove 36 is effective to reduce friction of the pawls 70 upon the further annular portion 34 during use as will now be described.

Application of torque to the outer cap 14, in the direction of the arrow X, is initially transmitted by means of the cam faces 82 of the ratchet teeth 80 of the pawls 70 to the cam faces 30 of the ratchet teeth 28 of the inner cap 12. The inner and outer caps 12 and 14 thus rotate in unison and the thread 20 can be screwed onto a petrol filler tube. When the filler cap 10 has been fully tightened the sealing ring 24 can form a seal with the end of the petrol filler tube. Continued tightening of the filler cap 10 rapidly becomes much more difficult, but if the user continues to try to tighten the filler cap 10 by applying a torque exceeding a predetermined torque level, the pawls 70 ride over the ratchet teeth 28 by compressing the spring 72 and the outer cap 14 is rotated relative to the inner cap 12. To undo the filler cap 10, torque is applied to the outer cap 14 in the direction of the arrow Y and is always transmitted by means of the radial faces 84 of the ratchet teeth 80 of the pawls 70 to the radial faces 32 of the ratchet teeth 28 of the inner cap 12. The inner and outer caps 12 and 14 are thus again rotated in unison.

It is believed that the filler cap 10 is not only practical and reliable but is attractive and of a useful low-profile or space-saving configuration.

Obviously, many modifications and variations of the present invention are possible in light of the above teachings. It is therefore to be understood that within the scope of the appended claims, the present invention may be practiced otherwise than as specifically described herein.

We claim:
1. A closure member for closing the open end of an article, comprising:
   a first member having a circumferentially arranged series of ratchet teeth; and
   a second member having finger gripping means for grasping said closure member and imparting rotational torque to said second member and a pair of pawls, rotationally movable with said second member relative to said article to be closed, continuously urged linearly apart from one another by spring means interposed between adjacent ends of said pawls so that the ends of said pawls remote from said spring means are continuously urged into gaps defined between said ratchet teeth of said first member,
   whereby application of said torque to said second member in one rotary direction is initially transmitted by said pawls of said second member to said ratchet teeth of said first member so as to rotate said first member in conjunction with said second member until said torque exceeds a predetermined level whereupon said pawls of said second member ride over said ratchet teeth of said first member and said second member is rotated relative to said first member, whereas application of said torque to said second member in the opposite rotary direction is always transmitted by said pawls of said second member to said ratchet teeth of said first member so as to rotate said first member in conjunction with said second member regardless of the level of said torque applied to said second member.

2. A closure member according to claim 1, in which the ends of the pawls remote from the spring means are each formed with a plurality of ratchet teeth complementary to the ratchet teeth formed on the first member.

3. A closure member according to claim 1, in which the first member is formed with a cylindrical sleeve having internal thread means for enabling the first member to be screwed onto the outside of said article to be closed.

4. A closure member according to claim 3, in which the second member is formed with a cylindrical sleeve having internal engagement means for enabling a second member to be snapped onto the outside of the cylindrical sleeve of the first member.

5. A closure member according to claim 1, in which the second member is formed with a circular recess which is spanned by a diammetrical bridge portion housing the pawls and the spring means so as to define a pair of segmental finger portions.

6. A closure member according to claim 1, which is adapted for use as a filler cap for a fuel tank on a motor vehicle by the provision of a pressure relief valve.

7. A closure member for closing the open end of an article, comprising:
   a first member having a circumferentially arranged series of ratchet teeth;
   a second member having a pair of pawls continuously urged linearly apart from one another by spring means interposed between adjacent ends of said pawls so that the ends of said pawls remote from said spring means are continuously urged into gaps defined between said ratchet teeth of said first member, said first member being formed with a cylindrical sleeve having thread means for enabling said first member to be threadedly engaged onto said article to be closed; and said second member being formed with a circular recess which is spanned by a diametrically extending bridge means for housing said pawls and said spring means of said second member so as to define a pair of segmental finger means for grasping said closure member and imparting rotational torque to said second member, whereby application of said torque to said second member in one rotary direction is initially transmitted by said pawls of said second member to said ratchet teeth of said first member so as to rotate said first member is conjunction with said second member until said torque exceeds a predetermined level whereupon said pawls of said second member ride over said ratchet teeth of said first member and said second member is rotated relative to said first member, whereas application of said torque to said second member in the opposite rotary direction is always transmitted by said pawls of said second member to said ratchet teeth of said first member so as to rotate said first member in conjunction with said second member regardless of the level of said torque applied to said second member.

8. A closure member as set forth in claim 2, wherein: each one of said ratchet teeth of said first and second members comprises a cam face and a radial face.

9. A closure member as set forth in claim 4, wherein: said internal engagement means of said second member comprises a plurality of circumferentially spaced radially inwardly projecting ribs.

10. A closure member as set forth in claim 9, wherein: said first member is provided with a circumferentially extending recess into which said engagement ribs of said second member are accommodated.

11. A closure member as set forth in claim 5, wherein: said diametrical bridge portion has a substantially inverted U-shaped configuration, and said finger portions are defined by substantially U-shaped recesses upon opposite sides of said bridge portion.

12. A closure member as set forth in claim 1, wherein: said pawls of said second member have oppositely facing spigots fixedly mounted upon said adjacent ends for mounting opposite ends of said spring means.

13. A closure member as set forth in claim 7, wherein: said thread means of said first member are internal thread means for enabling said closure member to be threadedly engaged onto the outside of said article to be closed.

14. A closure member as set forth in claim 7, wherein: said ends of said pawls remote from said spring means are each formed with a plurality of ratchet teeth which are complementary to said ratchet teeth of said first member; and each one of said ratchet teeth of said first and second members comprises a cam face and a radial face.

15. A closure member as set forth in claim 7, wherein: said second member is formed with a cylindrical sleeve having a plurality of radially inwardly projecting, circumferentially spaced, rib means; and said first member is provided with an annular recess means for accommodating said rib means of said second member whereby said second member can be snap-fitted onto said first member.

16. A closure member as set forth in claim 7, further comprising:

pressure relief valve means provided upon said first member for permitting excessive pressure vapor to be relieved through said closure member when said article to be closed by said closure member is a fuel tank filler pipe.

17. A closure member as set forth in claim 7, wherein: said diametrical bridge portion has a substantially inverted U-shaped configuration, and said finger means are defined by substantially U-shaped recesses upon opposite sides of said bridge portion.

18. A closure member as set forth in claim 7, wherein: said pawls of said second member have oppositely facing spigots fixedly mounted upon said adjacent ends for mounting opposite ends of said spring means.

19. A closure member for closing the open end of an article, comprising:

a first member having a circumferentially arranged series of ratchet teeth, and threaded means for enabling said first member to be threadedly engaged onto said article to be closed when rotational torque is applied to said closure member in a first rotational direction and to be threadedly disengaged from said article when rotational torque is applied to said closure member in a second opposite rotational direction; and a second member having a pair of pawls, rotationally movable with said second member relative to said article when said torque is applied to said closure member in either one of said rotational directions, continuously urged linearly apart from one another by spring means interposed between adjacent ends of said pawls so that the ends of said pawls remote from said spring means are continuously urged into gaps defined between said ratchet teeth of said first member, whereby application of said torque to said closure member in said first rotational direction is initially transmitted by said pawls of said second member to said ratchet teeth of said first member so as to rotate said first member in conjunction with said second member in order to threadedly engage said first member with said article to be closed until said torque exceeds a predetermined level whereupon said pawls of said second member ride over said ratchet teeth of said first member and said second member is rotated relative to said first member and said article, whereas application of said torque to said closure member in said second opposite rotational direction is always transmitted by said pawls of said second member to said ratchet teeth of said first member so as to rotate said first member in conjunction with said second member regardless of the level of said torque applied to said closure member so as to threadedly disengage said closure member from said article.

20. A closure member as set forth in claim 19, wherein:

said threaded means of said first member are internal threaded means for enabling said first member to be threadedly engaged upon the outside of said article to be closed.

* * * * *